United States Patent
Obara et al.

(10) Patent No.: US 10,998,139 B2
(45) Date of Patent: May 4, 2021

(54) SOLID ELECTROLYTIC CAPACITOR ELEMENT, SOLID ELECTROLYTIC CAPACITOR, AND MANUFACTURING METHOD OF SOLID ELECTROLYTIC CAPACITOR ELEMENT

(71) Applicant: Murata Manufacturing Co., Ltd., Nagaokakyo (JP)

(72) Inventors: Daisuke Obara, Nagaokakyo (JP); Takeo Arakawa, Nagaokakyo (JP); Takeshi Furukawa, Nagaokakyo (JP); Yuji Yokoyama, Nagaokakyo (JP); Yoshihiro Fujita, Nagaokakyo (JP); Masahiro Matsuo, Nagaokakyo (JP); Hideo Ito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 115 days.

(21) Appl. No.: 16/409,032

(22) Filed: May 10, 2019

(65) Prior Publication Data

US 2019/0267195 A1     Aug. 29, 2019

Related U.S. Application Data

(63) Continuation of application No. PCT/JP2017/040997, filed on Nov. 14, 2017.

(30) Foreign Application Priority Data

Nov. 14, 2016   (JP) .............................. JP2016-221515

(51) Int. Cl.
*H01G 9/15* (2006.01)
*H01G 9/052* (2006.01)
*H01G 9/00* (2006.01)

(52) U.S. Cl.
CPC ............. *H01G 9/15* (2013.01); *H01G 9/0029* (2013.01); *H01G 9/0525* (2013.01)

(58) Field of Classification Search
CPC .................................................. H01G 9/0525
See application file for complete search history.

(56) References Cited

U.S. PATENT DOCUMENTS

2004/0016978 A1   1/2004   Yano et al.
2006/0269436 A1*  11/2006  Yuan .................... H01G 9/0525
                                                                    419/31

(Continued)

FOREIGN PATENT DOCUMENTS

JP   S4830052 A      4/1973
JP   2002285268 A    12/2002

(Continued)

OTHER PUBLICATIONS

International Search Report issued for PCT/JP2017/040997, dated Feb. 13, 2018.

(Continued)

*Primary Examiner* — Eric W Thomas
(74) *Attorney, Agent, or Firm* — Arent Fox LLP

(57) ABSTRACT

A solid electrolytic capacitor element that includes a porous body, a dielectric layer on a surface of the porous body, and a solid electrolyte layer on a surface of the dielectric layer. The porous body is made from a sintered body of a Ti-alloy-containing grain having a Ti—Zr—X multicomponent alloy on a surface thereof, where X is at least one valve metal element selected from Si, Hf, Y, Al, Mo, W, Ta, Nb, and V, and a composition of the Ti—Zr—X multicomponent alloy is Ti: 50 atm % to 80 atm %, Zr: 8 atm % to 32 atm %, and X: 1 atm % to 20 atm %.

22 Claims, 3 Drawing Sheets

(56) References Cited

U.S. PATENT DOCUMENTS

| | | | |
|---|---|---|---|
| 2006/0279908 A1 | 12/2006 | Omori et al. | |
| 2013/0342966 A1 | 12/2013 | Norio | |
| 2016/0111221 A1 | 4/2016 | Murayama et al. | |
| 2016/0181021 A1* | 6/2016 | Kwak | H01G 9/052 361/528 |

FOREIGN PATENT DOCUMENTS

| | | | |
|---|---|---|---|
| JP | 2003224036 A | 8/2003 |
| JP | 2004349658 A | 12/2004 |
| JP | 20044349683 A | 12/2004 |
| JP | 2006173441 A | 6/2006 |
| JP | 2009182276 A | 8/2009 |
| JP | 2009188219 A | 8/2009 |
| JP | 2014203850 A | 10/2014 |
| JP | 2016082126 A | 5/2016 |
| WO | 2012124585 A1 | 9/2012 |

OTHER PUBLICATIONS

Written Opinion of the International Searching Authority issued for PCT/JP2017/040997, dated Feb. 13, 2018.

* cited by examiner

SOLID ELECTROLYTIC CAPACITOR ELEMENT, SOLID ELECTROLYTIC CAPACITOR, AND MANUFACTURING METHOD OF SOLID ELECTROLYTIC CAPACITOR ELEMENT

CROSS REFERENCE TO RELATED APPLICATIONS

The present application is a continuation of International application No. PCT/JP2017/040997, filed Nov. 14, 2017, which claims priority to Japanese Patent Application No. 2016-221515, filed Nov. 14, 2016, the entire contents of each of which are incorporated herein by reference.

FIELD OF THE INVENTION

The present invention relates to a solid electrolytic capacitor element, a solid electrolytic capacitor, and a manufacturing method of a solid electrolytic capacitor element.

BACKGROUND OF THE INVENTION

Solid electrolytic capacitors are produced, for example, by a method of forming a dielectric oxide film layer by chemical conversion treatment on the surface of an electrode body made from a valve action metal and having been subjected to surface roughing treatment by etching; thereafter separating into an anode portion and a cathode portion by sticking an insulating adhesive tape of polyimide or the like from the front and back surface sides; forming a solid electrolyte layer made from a conductive polymer on the cathode portion; and thereafter forming a cathode layer of a carbon layer and a silver paste layer.

The electrostatic capacitance of a solid electrolytic capacitor is dependent on a thickness of a dielectric oxide film layer and a relative permittivity of a dielectric oxide film. The value of the relative permittivity of aluminum oxide is not so high as compared with the value of the relative permittivity of the oxide of other valve action metals. Accordingly, attempts are made to improve the electrostatic capacitance of a solid electrolytic capacitor by replacing the aluminum with other valve action metals. For example, Patent Document 1 discloses a solid electrolytic capacitor that uses, as a valve action metal, titanium whose oxides have the relative permittivity of 10 or more times that of aluminum.

Patent Document 1: Japanese Patent Application Laid-Open No. 2003-224036

SUMMARY OF THE INVENTION

However, in the solid electrolytic capacitor disclosed by Patent Document 1 that uses titanium as the valve action metal, there has been a problem that a value of a leakage current will become large. Moreover, in the solid electrolytic capacitor that uses a Ti—Zr alloy as the valve action metal, a value of a leakage current can be made small. However, there has been a problem that the value of relative permittivity will lower greatly.

The present invention has been achieved in order to solve the above-described problems, and an object of the present invention is to provide a solid electrolytic capacitor element with large electrostatic capacitance while suppressing a leakage current.

A solid electrolytic capacitor element according to the present invention includes a porous body, a dielectric layer on a surface of the porous body, and a solid electrolyte layer on a surface of the dielectric layer. The porous body is made from a sintered body of a Ti-alloy-containing grain having a Ti—Zr—X multicomponent alloy on a surface thereof, where the X is at least one valve metal element selected from Si, Hf, Y, Al, Mo, W, Ta, Nb, and V, and a composition of the Ti—Zr—X multicomponent alloy is Ti: 50 atm % to 80 atm %, Zr: 8 atm % to 32 atm %, and X: 1 atm % to 20 atm %.

In the solid electrolytic capacitor element according to the present invention, it is preferable that the X is Al, and a content of X in the Ti—Zr—X multicomponent alloy is 1 atm % to 20 atm %.

In the solid electrolytic capacitor element according to the present invention, it is preferable that the X is Al, and a content of X in the Ti—Zr—X multicomponent alloy is 1 atm % to 15 atm %.

In the solid electrolytic capacitor element according to the present invention, it is preferable that the X is Al, and a content of X in the Ti—Zr—X multicomponent alloy is 4 atm % to 12 atm %.

In the solid electrolytic capacitor element according to the present invention, it is preferable that the X is Al, and a content of X in the Ti—Zr—X multicomponent alloy is 10 atm % to 15 atm %.

In the solid electrolytic capacitor element according to the present invention, it is preferable that the X is Al, and a content of X in the Ti—Zr—X multicomponent alloy is 10 atm % to 12 atm %.

In the solid electrolytic capacitor element according to the present invention, it is preferable that a content of the Zr [Zr/(Ti+Zr)] occupying in a sum total of the Ti and the Zr is 9 atm % to 38 atm %.

In the solid electrolytic capacitor element according to the present invention, it is preferable that a content of the Zr [Zr/(Ti+Zr)] occupying in a sum total of the Ti and the Zr is 9 atm % to 35 atm %.

In the solid electrolytic capacitor element according to the present invention, it is preferable that a content of the Zr [Zr/(Ti+Zr)] occupying in a sum total of the Ti and the Zr is 17 atm % to 26 atm %.

In the solid electrolytic capacitor element according to the present invention, it is preferable that the X is Si, and a content of X in the Ti—Zr—X multicomponent alloy is 5 atm % to 20 atm %.

In the solid electrolytic capacitor element according to the present invention, it is preferable that the X is W, and a content of X in the Ti—Zr—X multicomponent alloy is 5 atm % to 20 atm %.

In the solid electrolytic capacitor element according to the present invention, it is preferable that an average grain diameter of the Ti-alloy-containing grain is 10 nm to 1 μm.

In the solid electrolytic capacitor element according to the present invention, it is preferable that the Ti-alloy-containing grain is a covered grain in which a surface of a base grain is covered with a coat layer made from the Ti—Zr—X multicomponent alloy.

In the solid electrolytic capacitor element according to the present invention, it is preferable that the base grain is made from at least one valve metal element selected from Zr, Ti, Si, Hf, Y, Al, Mo, W, Ta, Nb, and V.

In the solid electrolytic capacitor element according to the present invention, it is preferable that the Ti-alloy-containing grain is a Ti—Zr—X multicomponent alloy grain.

In the solid electrolytic capacitor element according to the present invention, it is preferable that the porous body is provided on a metal base containing Al, Ti, Ta, or a Ti—Zr—X multicomponent alloy.

In the solid electrolytic capacitor element according to the present invention, it is preferable that the dielectric layer is an oxide of the Ti—Zr—X multicomponent alloy.

A solid electrolytic capacitor according to the present invention includes the solid electrolytic capacitor element according to the present invention, a sealing resin that seals the solid electrolytic capacitor element, and a pair of external electrodes that are electrically connected to the solid electrolytic capacitor element.

A manufacturing method of a solid electrolytic capacitor element according to the present invention, includes sintering a Ti-alloy-containing grain having a Ti—Zr—X multicomponent alloy on a surface thereof to obtain a porous body made from the Ti-alloy-containing grain, where X is at least one valve metal element selected from Si, Hf, Y, Al, Mo, W, Ta, Nb, and V; forming a dielectric layer on a surface of the porous body; and forming a solid electrolyte layer on the dielectric layer.

In the manufacturing method of a solid electrolytic capacitor element according to the present invention, it is preferable that the sintering is performed after the Ti-alloy-containing grain containing grain is compressed or while the Ti-alloy-containing grain is being compressed.

In the manufacturing method of a solid electrolytic capacitor element according to the present invention, it is preferable that a covered grain is used as the Ti-alloy-containing grain, the covered grain having a coat layer made from a Ti—Zr—X multicomponent alloy formed on a surface of a base grain by any of sputtering, vapor deposition, and electroless plating.

In the manufacturing method of a solid electrolytic capacitor element according to the present invention, it is preferable that an alloy grain obtained by pulverizing a Ti—Zr—X multicomponent alloy is used as the Ti-alloy-containing grain.

According to the present invention, it is possible to provide a solid electrolytic capacitor element with large electrostatic capacitance while suppressing a leakage current.

DETAILED DESCRIPTION OF THE INVENTION

[Solid Electrolytic Capacitor Element]

Hereinafter, a solid electrolytic capacitor element of the present invention will be described. However, the present invention is not limited to a configuration described below and can be applied by being changed appropriately within a rage where the gist of the present invention is not changed. A configuration obtained by combining two or more individual desirable configurations of the present invention described below is also included in the present invention.

Figure 1:
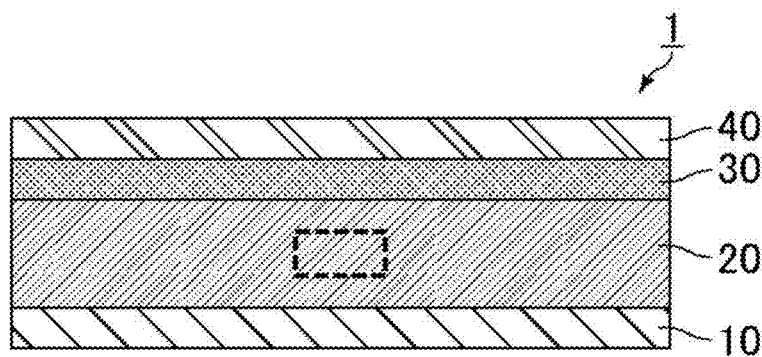
FIG. 1 is a cross sectional view schematically showing one example of a solid electrolytic capacitor element of the present invention.
Figure 2:
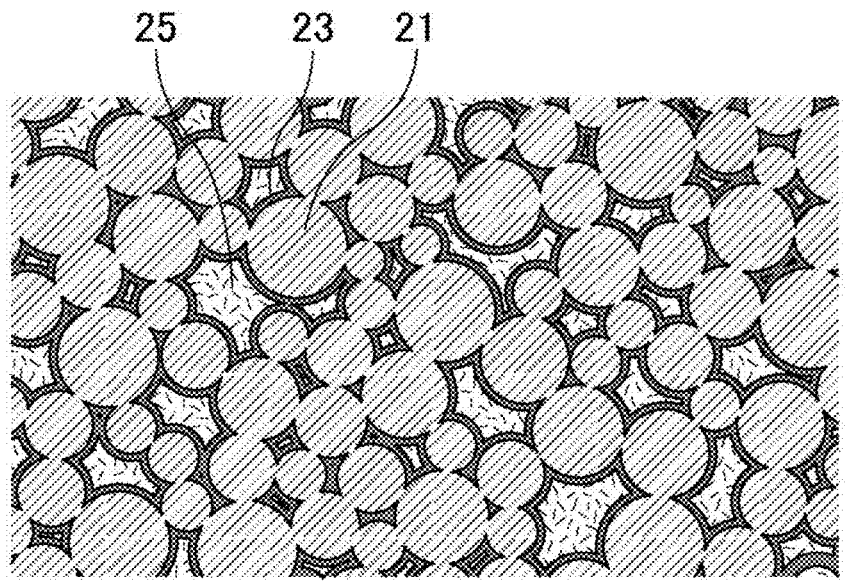
FIG. 2 is an enlarged cross-sectional view of a broken line portion of a capacitance layer 20 shown in FIG. 1.

A configuration of a solid electrolytic capacitor element of the present invention is described. With reference to FIG. 1 and FIG. 2, an example of a configuration of a solid electrolytic capacitor element of the present invention is described. FIG. 1 is a cross sectional view schematically showing one example of a solid electrolytic capacitor element of the present invention, and FIG. 2 is an enlarged cross-sectional view of a broken line portion of a capacitance layer 20 shown in FIG. 1. As shown in FIG. 1, a solid electrolytic capacitor element 1 includes an anode portion 10, a cathode portion 40 to be a counter electrode, a conductor layer 30 disposed on the cathode portion 40 side, and a capacitance layer 20 disposed between the conductor layer 30 and the anode portion 10. Moreover, as shown in FIG. 2, the capacitance layer 20 includes a porous body 21, a dielectric layer 23 provided on the surface of the porous body 21, and a solid electrolyte layer 25 provided on the surface of the dielectric layer 23.

The anode portion 10 is, for example, a metal base. Although not shown in FIG. 1 and FIG. 2, the porous body 21 is electrically connected to the anode portion 10 and the solid electrolyte layer 25 is electrically connected to the conductor layer 30. Specifically, since a surface (also referred to as the surface of the solid electrolyte layer 25), which does not come into contact with the dielectric layer 23 and is exposed from the porous body 21, of the solid electrolyte layer 25 comes into contact with the conductor layer 30, the solid electrolyte layer 25 and the conductor layer 30 are electrically connected to each other.

The porous body 21 is made from a sintered body of Ti-alloy-containing grains. The Ti-alloy-containing grains constituting the porous body 21 have a structure (partial surface contact structure) in which a plurality of Ti-alloy-containing grains themselves are connected to each other in series. Grains connected to each other in series by causing partial surface contact is also referred to as necking, and as shown in FIG. 2, a structure in which a plurality of Ti-alloy-containing grains themselves are connected to each other in series is also referred to as a necking structure. The solid electrolyte layer 25 is provided on the surface of the dielectric layer 23.

The cathode portion 40 is, for example, a conductor, such as a metal foil, to be electrically connected to the conductor layer 30. In the case where a metal foil is provided on the outside of the conductor layer, an equivalent series resistance (ESR) can be reduced. However, in the solid electrolytic capacitor element of the present invention, the cathode portion 40 may not be formed.

In the solid electrolytic capacitor element 1 shown in FIG. 1, the capacitance layer 20, the conductor layer 30, and the cathode portion 40 are formed on only one surface of the anode portion 10. However, the capacitance layer 20, the conductor layer 30, and the cathode portion 40 may also be formed on the other surface of the anode portion 10.

The solid electrolytic capacitor element of the present invention includes, as the porous body, a porous body made from a sintered body of Ti-alloy-containing grains that have a Ti—Zr—X multicomponent alloy on their surface. Therefore, similarly to the conventional solid electrolytic capacitor element using aluminum, it is possible to increase the specific surface area of a porous body. Furthermore, in the case where the dielectric layer is made from an oxide of a Ti—Zr—X multicomponent alloy, it is possible to make the relative permittivity of the dielectric layer larger than that of a dielectric layer (alumina) based on aluminum. On the other hand, a leakage current does not become large as in the conventional solid electrolytic capacitor using titanium. Therefore, it is possible to provide a solid electrolytic capacitor that operates stably, while securing high electrostatic capacitance.

Figure 3:
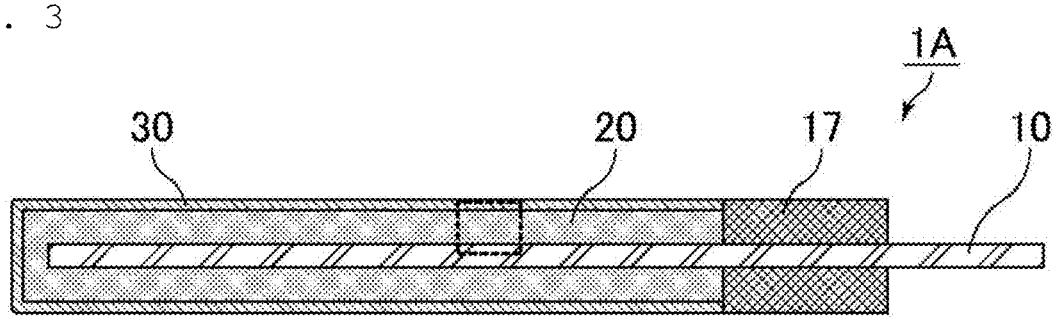
FIG. 3 is a cross sectional view schematically showing another example of the solid electrolytic capacitor element of the present invention.

FIG. 3 is a cross sectional view schematically showing another example of the solid electrolytic capacitor element of the present invention. A solid electrolytic capacitor element 1A shown in FIG. 3 includes an anode portion 10, a capacitance layer 20 provided on the anode portion 10, and a conductor layer 30 provided on the capacitance layer 20. Moreover, in order to insulate the conductor layer 30 from the anode portion 10, an insulating mask portion 17 is formed on the surface of the anode portion 10. Different from the solid electrolytic capacitor element 1 described in FIG. 1, the cathode portion 40 is not provided in the solid electrolytic capacitor element 1A shown in FIG. 3.

Figure 4:
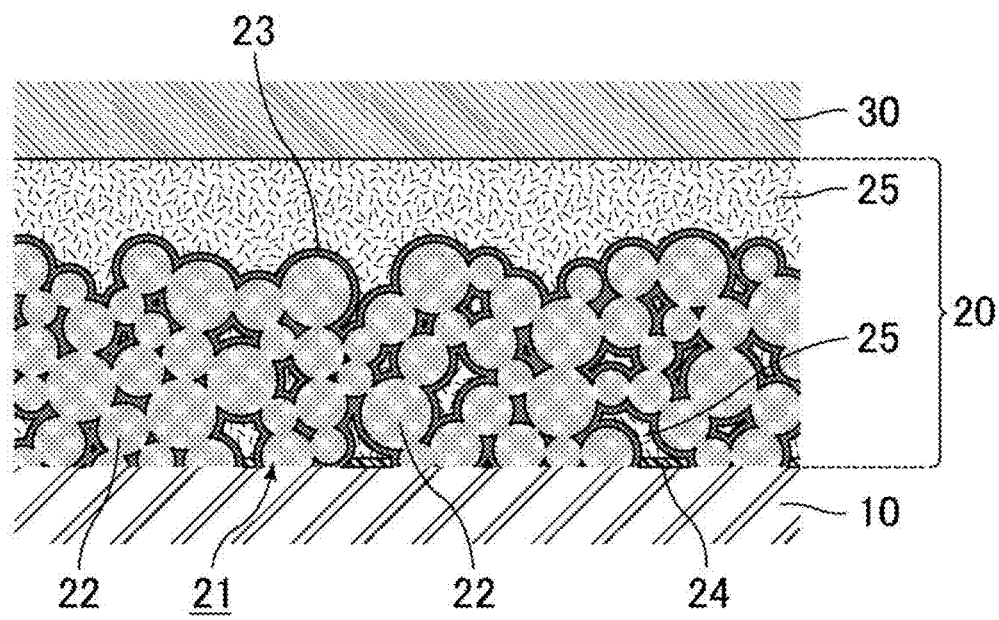
FIG. 4 is an enlarged cross-sectional view of a broken line portion shown in FIG. 3.

FIG. 4 is an enlarged cross-sectional view of a broken line portion shown in FIG. 3. As shown in FIG. 4, the capacitance layer 20 includes the porous body 21, the dielectric layer 23, and the solid electrolyte layer 25. The porous body 21 has a necking structure in which a plurality of Ti-alloy-containing grains 22 are connected to each other in series and is porous. The dielectric layer 23 is provided on the surfaces of the Ti-alloy-containing grains 22 that constitute the porous body 21. The dielectric layer 23 reflects the surface state of the Ti-alloy-containing grain 22 and has a minute convexoconcave surface shape. On the surface of the dielectric layer 23, the solid electrolyte layer 25 is disposed. The solid electrolyte layer 25 may cover the dielectric layer 23 or may be filled in fine pores (concave portion). The conductor layer 30 is provided on the surface of the solid electrolyte layer 25.

As shown in FIG. 4, the Ti-alloy-containing grains 22 constituting the porous body 21 are also joined to the anode portion 10. Therefore, the porous body 21 is electrically connected to the anode portion 10. Moreover, the dielectric layer 24 is also formed on a portion, to which the porous body 21 is not joined, of the surface of the anode portion 10.

Figure 5:
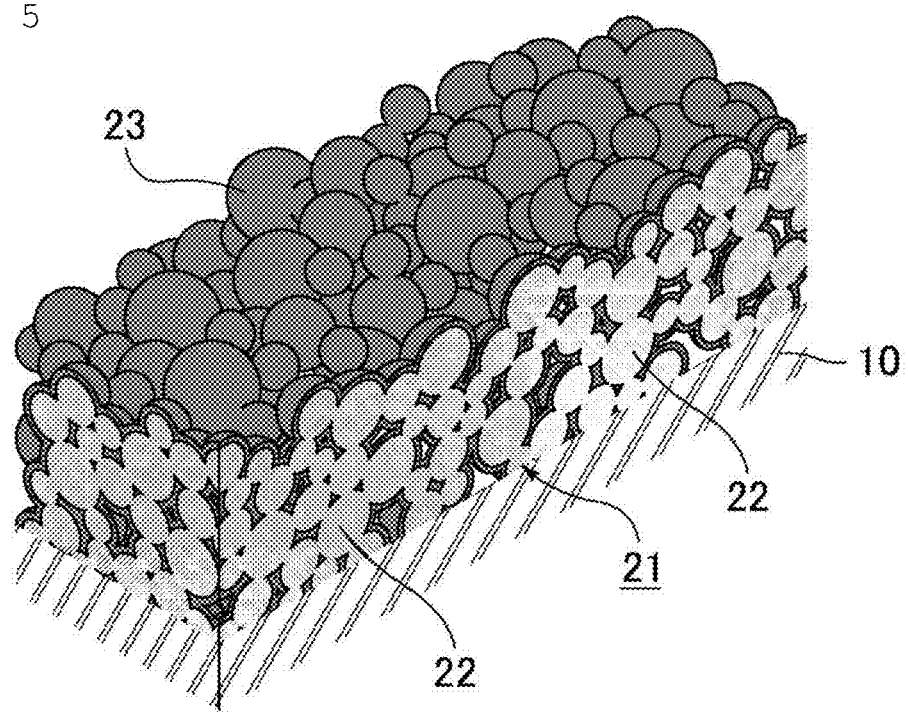
FIG. 5 is a perspective cross-sectional view schematically showing one example of a case where a porous body and a dielectric layer that constitute the solid electrolytic capacitor element of the present invention are formed on an anode portion.

With reference to FIG. 5, the porous body and the dielectric layer that constitute the solid electrolytic capacitor element of the present invention are described. FIG. 5 is a perspective cross-sectional view schematically showing one example of the case where the porous body and the dielectric layer that constitute the solid electrolytic capacitor element of the present invention are formed on the anode portion. As shown in FIG. 5, the porous body 21 is made from a sintered body of the Ti-alloy-containing grains 22, and the dielectric layer 23 is provided on the surfaces of the Ti-alloy-containing grains 22 constituting the porous body 21. Moreover, the Ti-alloy-containing grains 22 constituting the porous body 21 are joined also to the anode portion 10 and are joined firmly.

In the solid electrolytic capacitor element of the present invention, the porous body is made from a sintered body of the Ti-alloy-containing grains that have a Ti—Zr—X multicomponent alloy on their surface. X is an element (the third component) that constitutes a Ti—Zr—X multicomponent alloy together with Ti and Zr, is at least one element selected from a group consisting of Si, Hf, Y, Al, Mo, W, Ta, Nb, and V, and is preferably Si, W, or Al. In the case where the third component is the above-described element, as compared with a Ti—Zr alloy, it is possible to improve a relative permittivity, or suppress a leakage current. Although Si and Al have high oxygen affinity similarly to Zr, the band gap of the element is large. Accordingly, as compared with a case of a binary system where only Zr is added to Ti, it is considered that the withstand voltage of the anodic oxide film being an oxide can be improved and a relative permittivity can be made large. Since W has high thermal stability and is easy to emit electrons, it is considered that it suppresses the oxidation number of Ti of an anodic oxide film from fluctuating in high temperature and contributes to the stable formation of the anodic oxide film.

In the solid electrolytic capacitor element of the present invention, a composition of a Ti—Zr—X multicomponent alloy is Ti: 50 atm % to 80 atm %, Zr: 8 atm % to 32 atm %, and X: 1 atm % to 20 atm %. The composition may also be Ti: 50 atm % to 80 atm %, Zr: 14 atm % to 30 atm %, and X: 1 atm % to 20 atm %. In the case where the composition of the Ti—Zr—X multicomponent alloy is within the above-described range, it is possible to suppress the leakage current with improving the relative permittivity. In the case where X is Al, the content of X is preferably 1 atm % to 20 atm %, is more preferably 1 atm % to 15 atm % from the viewpoint of improving the relative permittivity, is more preferably 4 atm % to 20 atm % from the viewpoint of suppressing the leakage current, and is still more preferably 4 atm % to 12 atm % from the viewpoint of achieving both the improvement in the relative permittivity and the suppression of the leakage current. Moreover, in the case where X is Al, it is also preferable that the content of X is 10 atm % to 15 atm %, and it is also more preferable that the content of X is 10 atm % to 12 atm %. In the case where X is Si, the content of X is preferably 5 atm % to 20 atm % and is more preferably 5 atm % to 6 atm % from the viewpoint of improving the relative permittivity. In the case where X is W, the content of X is preferably 5 atm % to 20 atm %, and from the viewpoint of improving the relative permittivity, is more preferably 5 atm % to 12 atm %, and is still more preferably 5 atm % to 10 atm %.

In the case where the content of Ti is less than 50 atm %, a significant decrease in a relative permittivity may be observed in some cases. On the other hand, in the case where the content of Ti exceeds 80 atm % and in the case where the content of Zr is less than 8 atm %, the leakage current characteristic may degrade. Note that, the components and alloy composition constituting the Ti—Zr—X multicomponent alloy can be measured by a method in which X-ray photoelectron spectroscopy (XPS) is performed on a Ti—Zr—X multicomponent alloy or an anodic oxide film being its oxide or a method in which an ICP light emission spectrometry is performed by dissolving a porous body containing a Ti—Zr—X multicomponent alloy into an acidic aqueous solution.

In the solid electrolytic capacitor element of the present invention, the ratio (hereinafter, also referred to as a Ti:Zr atom ratio) of Ti and Zr occupying in the Ti—Zr—X multicomponent alloy is not particularly limited. However, from a viewpoint of achieving both the improvement in the relative permittivity and the suppression of a leakage current, the content of Zr occupying in the sum total of Ti and Zr denoted by [Zr/(Ti+Zr)] is preferably 9 atm % to 38 atm %, is more preferably 9 atm % to 35 atm %, and is still more preferably 17 atm % to 26 atm %.

A shape of a Ti-alloy-containing grain is not particularly limited. However, it is preferably an approximately spherical shape (including a sphere) or an ellipsoidal shape.

The average grain diameter of the Ti-alloy-containing grains is not particularly limited. However, it is preferably 10 nm to 1 µm and is more preferably 10 nm to 300 nm. In the case where the average grain diameter of the Ti-alloy-containing grains is within the above-described range, a surface area of a porous body can be increased, and thus it is possible to obtain high electrostatic capacitance. In the case where the average grain diameter of the Ti-alloy-containing grains is less than 10 nm, the Ti-alloy-containing grains constituting the porous body is small, and thus it may be difficult to form the dielectric layer with a sufficient thickness on the porous body. Moreover, the contact points between the Ti-alloy-containing grains may decrease, which may lead to increase in the internal resistance of the solid electrolytic capacitor element. On the other hand, in the case where the average grain diameter of the Ti-alloy-containing grains exceeds 1 µm, the specific surface area of the porous body is lowered, and the advantageous electrostatic capacitance may not be exerted as compared with aluminum foils, tantalum pellets, niobium pellet, and the like which are the existing electrode materials for the electrolytic capacitors.

The average grain diameter of the Ti-alloy-containing grains constituting the porous body can be measured by the following method. In five regions (10 µm×10 µm) randomly selected by observing a cut plane of the porous body with a scanning electron microscope (SEM), the diameters of an approximate circle and a circle corresponding to the projected area of the approximate circle are obtained for all the Ti-alloy-containing grains constituting the porous body, and the average value of the diameters is set as the average grain diameter of the Ti-alloy-containing grains.

As long as the Ti-alloy-containing grains have the Ti—Zr—X multicomponent alloy on their surfaces, their configurations are not particularly limited. However, examples of the Ti-alloy-containing grains include an alloy grain made from Ti—Zr—X multicomponent alloys and a covered grain in which the surface of a base grain is covered with a coat layer made from the Ti—Zr—X multicomponent alloy.

The material constituting the above-described base grain is not particularly limited. However, the base grain is preferably made from at least one valve metal element selected from a group consisting of Zr, Ti, Si, Hf, Y, Al, Mo, W, Ta, Nb, and V, and is more preferably made from Zr, Ti, Al, Si, or Ta. In the case where the base grain is constituted by the above-described elements, the contactness with the coat layer made from the Ti—Zr—X multicomponent alloy is good, and it is possible to make electric resistance in the interface between the base grain and the coat layer small. Note that, as the base grain, two or more kinds of grains made from different materials may be used in combination.

The average porosity of the porous body constituting the solid electrolytic capacitor element of the present invention is not particularly limited. However, it is preferably 15% to 60%. The porosity of the porous body represents an area ratio of a pore size opening portion. The area ratio of the pore size opening portion is calculated by averaging the ratios of the regions occupied by pores in five regions (10 µm×10 µm) randomly selected by observing a cut plane of the porous body with SEM.

The average pore size of the porous body constituting the solid electrolytic capacitor element of the present invention is not particularly limited. However, it is preferably 10 nm to 1000 nm. The average pore size of the porous body is a median diameter D50 measured by a mercury porosimeter.

In the solid electrolytic capacitor element of the present invention, the thickness of the porous body is not particularly limited. However, it is preferably 50 µm to 100 µm.

In the solid electrolytic capacitor element of the present invention, the material constituting the dielectric layer is preferably an oxide of the Ti—Zr—X multicomponent alloy contained in the Ti-alloy-containing grains. In the case where the dielectric layer is constituted by an oxide of the Ti—Zr—X multicomponent alloy contained in the Ti-alloy-containing grains, the adhesion between the porous body and the dielectric layer is improved.

The thickness of the dielectric layer is not particularly limited. However, it is preferably 5 nm to 100 nm.

A method of forming the dielectric layer on the surface of the Ti-alloy-containing grains constituting the porous body is not particularly limited. However, examples of the method include a method in which the surface of the Ti—Zr—X multicomponent alloy constituting the porous body is oxidized by anodizing treatment such as chemical conversion treatment. At this time, by simultaneously performing the chemical conversion treatment also for a metal base or the like to be the anode portion, it is possible to form the dielectric layer also on the surface of the anode portion, and to prevent the anode portion from coming into direct contact with the solid electrolyte layer.

In the solid electrolytic capacitor element of the present invention, the material constituting the solid electrolyte layer is not particularly limited. However, examples of the material include materials in which pyrroles, thiophenes, anilines or the like are made a skeleton. Examples of a material in which thiophenes are made a skeleton include PEDOT [poly (3,4-ethylenedioxythiophene)], and PEDOT: PSS complexed with polystyrene sulfonate (PSS) to be a dopant. It is preferable that the solid electrolyte layer includes an internal layer that fills the pores (concave portion) of the dielectric layer and an outer layer that covers the dielectric layer.

In the solid electrolytic capacitor element of the present invention, it is preferable that the conductor layer having conductivity is provided on the surface of the solid electrolyte layer. In the case where the conductor layer is provided on the surface of the solid electrolyte layer, it is possible to draw out an electric current from the capacitor element through the conductor layer. It is preferable that the conductor layer includes a carbon layer being a foundation and a silver layer provided on the carbon layer. However, the conductor layer may include only the carbon layer or only the silver layer.

The cathode portion to be electrically connected to the conductor layer may be provided on the surface of the conductor layer.

In the solid electrolytic capacitor element of the present invention, it is preferable that the porous body is provided on a metal base containing Al, Ti, Ta, or a Ti—Zr—X multicomponent alloy, or a lead-out terminal containing Al, Ti, Ta, or a Ti—Zr—X multicomponent alloy is connected to the porous body. Each of the metal base and the lead-out terminal becomes a terminal (anode portion) for drawing out an electric current from the porous body side to the outside. The metal base and the lead-out terminal may further contain Nb. Furthermore, the lead-out terminal may be connected to the metal base. Since the metal base or the lead-out terminal contains Al, Ti, Ta, or a Ti—Zr—X multicomponent alloy, an adhesive property with the Ti—Zr—X multicomponent alloy constituting the porous body is improved.

The shape of the metal base (anode portion) to be connected to the porous body constituting the solid electrolytic capacitor element of the present invention is preferably a shape that comes into contact with the porous body with a surface, and is more preferably a foil shape. The shape of the lead-out terminal (anode portion) to be connected to the porous body constituting the solid electrolytic capacitor element of the present invention is preferably a shape that comes into contact with the porous body with a point or a line, and is more preferably a line shape.

It is preferable that each of the metal base and the lead-out terminal is configured so as not to come into contact with the solid electrolyte layer. In the case where the metal base and the lead-out terminal come into contact with the solid electrolyte layer, a leakage current may increase.

In order to prevent the metal base or the lead-out terminal from coming into contact with the solid electrolyte layer, an insulation portion (also referred to as an insulating mask portion) may be provided on the metal base or the lead-out terminal. By providing the insulation portion on the anode portion, it is possible to suppress a failure mode (also referred to as an LC failure) in which leakage current increases. The material constituting the insulation portion is not particularly limited. However, examples of the material include insulating resins, such as a polyphenyl sulfone (PPS) resin, a polyether sulfone (PES) resin, a cyanate ester resin, a fluororesin (tetrafluoroethylene, tetrafluoroethylene-perfluoroalkyl vinyl ether copolymer, etc.), a composition containing a soluble polyimide siloxane and an epoxy resin, a polyimide resin, a polyamide imide resin, and their derivatives or precursors.

The value of the leakage current in the solid electrolytic capacitor element of the present invention is preferably less than 70 times (70 CV) the product (CV) of the capacitance and the rated voltage, more preferably less than 45 times (45 CV), still more preferably less than 10 time (10 CV), and particularly preferably 1 time (1 CV) or less.

The relative permittivity of the dielectric layer in the solid electrolytic capacitor element of the present invention preferably exceeds 10, more preferably exceeds 30, and is still more preferably 40 or more. Most preferably, the leakage current is 1 CV or less and the relative permittivity of the dielectric layer is 40 or more.

[Solid Electrolytic Capacitor]

Subsequently, the solid electrolytic capacitor of the present invention is described. The solid electrolytic capacitor of the present invention includes a solid electrolytic capacitor element of the present invention, a sealing resin that seals the solid electrolytic capacitor element, and a pair of external electrodes electrically connected to the solid electrolytic capacitor element. Since the solid electrolytic capacitor of the present invention includes the solid electrolytic capacitor element of the present invention, it is possible to exert high electrostatic capacitance while suppressing a leakage current.

The pair of external electrodes constituting the solid electrolytic capacitor of the present invention includes an anode electrode to be electrically connected to the anode portion side and a cathode electrode to be electrically connected to the cathode portion side. In the solid electrolytic capacitor element constituting the solid electrolytic capacitor of the present invention, in the case where the lead-out terminal to be an anode portion is connected to the porous body, the lead-out terminal may be used as an anode electrode as it is.

Figure 6:
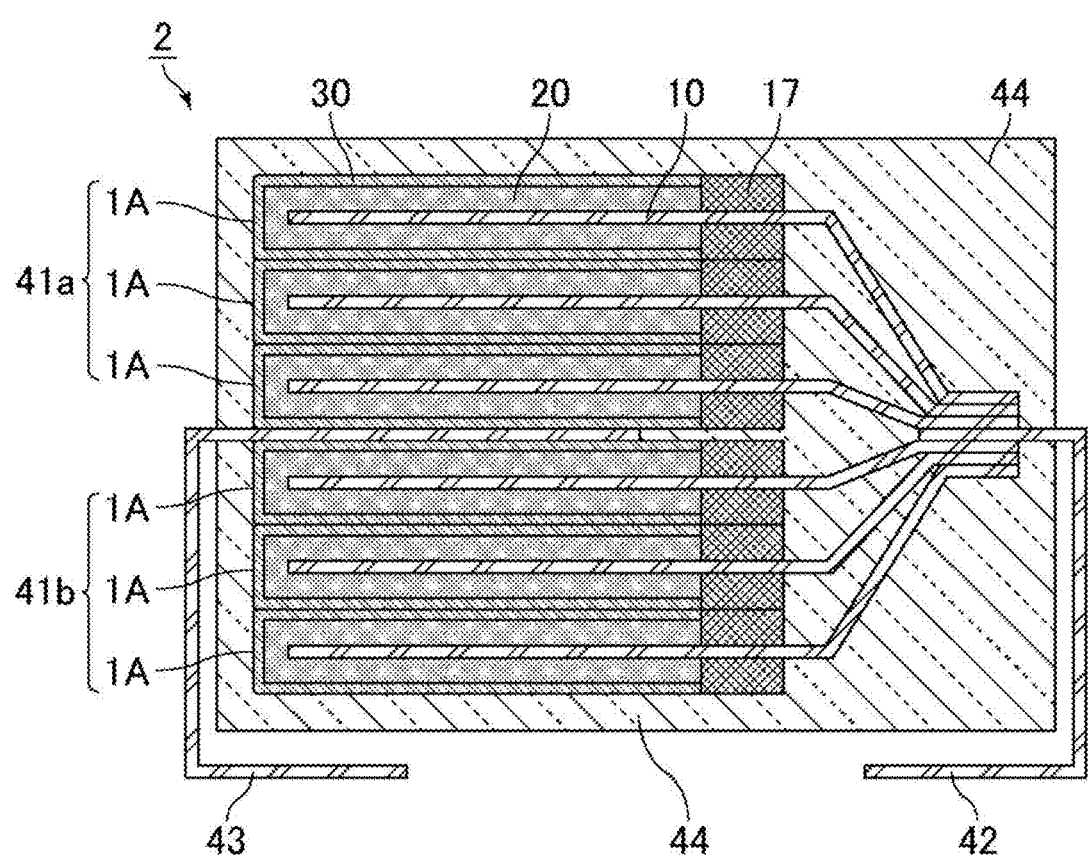
FIG. 6 is a cross sectional view schematically showing one example of a solid electrolytic capacitor of the present invention.

A configuration of the solid electrolytic capacitor of the present invention is described with reference to FIG. 6. FIG. 6 is a cross sectional view schematically showing one example of the solid electrolytic capacitor of the present invention. FIG. 6 schematically shows a structure of a solid electrolytic capacitor 2 in which a plurality of solid electrolytic capacitor elements 1A shown in FIG. 3 are laminated. The solid electrolytic capacitor 2 shown in FIG. 6 includes a first solid electrolytic capacitor element laminate 41a and a second solid electrolytic capacitor element laminate 41b in each of which three solid electrolytic capacitor elements 1A are laminated, and a sealing resin 44, and further includes an anode electrode 42 and a cathode electrode 43 as external electrodes. The sealing resin 44 covers the whole solid electrolytic capacitor element 1A, a part of the anode electrodes 42, and a part of the cathode electrodes 43. The three solid electrolytic capacitor elements 1A constituting the first solid electrolytic capacitor element laminate 41a come into contact with each other via the conductor layer 30, and the three solid electrolytic capacitor elements 1A constituting the second solid electrolytic capacitor element laminate 41b come into contact with each other via the conductor layer 30. Moreover, each of the first solid electrolytic capacitor element laminate 41a and the second solid electrolytic capacitor element laminate 41b is connected to the cathode electrode 43 via the conductor layer 30. However, the number of the solid electrolytic capacitor elements in the solid electrolytic capacitor of the present invention is not particularly limited, and a single solid electrolytic capacitor element may be used.

The solid electrolytic capacitor element 1A includes an anode portion 10, a capacitance layer 20 provided on the anode portion 10, and a conductor layer 30 provided on the capacitance layer 20. Moreover, in order to insulate the anode portion 10 from the conductor layer 30, the insulating mask portion 17 is formed on the surface of the anode portion 10.

The anode electrode 42 is made from metal materials and is formed as a lead frame on the anode portion 10 side. The respective anode portions 10 of the solid electrolytic capacitor elements 1A are joined to each other and the anode portions 10 of the solid electrolytic capacitor elements 1A are integrally joined to the anode electrode 42 by, for example, welding such as resistance welding or pressure bonding.

The cathode electrode 43 is made from metal materials and is formed as a lead frame on the conductor layer 30 side. The conductor layers 30 of the solid electrolytic capacitor elements 1A and the cathode electrode 43 are joined integrally with, for example, a conductive paste (not shown), such as a silver paste.

[Manufacturing Method of Solid Electrolytic Capacitor Element]

Hereinafter, a manufacturing method of the solid electrolytic capacitor element of the present invention will be described. The manufacturing method of the solid electrolytic capacitor element of the present invention includes a step of obtaining a porous body, a step of forming a dielectric layer on a surface of the porous body, and a step of forming a solid electrolyte layer on the dielectric layer, wherein in the step of obtaining the porous body, Ti-alloy-containing grains having a Ti—Zr—X multicomponent alloy (X is an element that constitutes a multicomponent alloy together with Ti and Zr) on a surface is sintered, to obtain the porous body made from Ti-alloy-containing grains.

In the step of obtaining the porous body, the porous body is obtained by sintering the Ti-alloy-containing grains having a Ti—Zr—X multicomponent alloy on their surface.

As the Ti—Zr—X multicomponent alloy and the Ti-alloy-containing grains having the Ti—Zr—X multicomponent alloy, those described in the solid electrolytic capacitor element of the present invention can be used suitably.

Specifically, a covered grain in which a coat layer made from a Ti—Zr—X multicomponent alloy is formed on the surface of a base grain, or an alloy grain obtained by pulverizing the Ti—Zr—X multicomponent alloy can be used.

Note that, the average grain diameter (D50) obtained by measuring Ti-alloy-containing grains with SAXS (X-ray small angle scattering method) can be set as the average grain diameter of the Ti-alloy-containing grains.

The material constituting the base grain is not particularly limited. However, the base grain is preferably made from at least one valve metal element selected from a group consisting of Zr, Ti, Si, Hf, Y, Al, Mo, W, Ta, Nb, and V, and the base grain is more preferably made from Zr, Ti, Al, Si, or Ta.

As a method of forming a coat layer made from the Ti—Zr—X multicomponent alloy on the surfaces of base grains, conventionally-known methods such as sputtering, vapor deposition, and electroless plating can be used. In particular, sputtering is preferable, because the composition of a coat layer is easily adjusted to a desired alloy composition.

With regard to alloy grains obtained by pulverizing a Ti—Zr—X multicomponent alloy, for example, a simple substance (regardless of its shape) of each element of the Ti—Zr—X multicomponent alloy is melted at a desired melting temperature by using a melting method such as an arc melting method and a high frequency melting method (induction heating method). Thereafter, by cooling at a desired cooling rate, an ingot of a homogeneous alloy is obtained. Then, the ingot of this alloy is pulverized to obtain desired alloy grains.

Examples of a method of obtaining the porous body include the sintering of the Ti-alloy-containing grains. However, the sintering may be performed after the Ti-alloy-containing grains are compressed (pressurized), or while the Ti-alloy-containing grains are being compressed. Examples of the method include a method of kneading Ti-alloy-containing grains with an organic binder and an organic solvent so as to make a paste, screen-printing on an anode portion with the paste, and sintering the printed paste; a method of pressure-molding Ti-alloy-containing grains on an anode portion and sintering this pressure-molded body (also, referred to as a pellet); and a method of pressurizing Ti-alloy-containing grains on an anode portion and simultaneously sintering the grains.

As a sintering condition, it is preferable to perform heating at 500° C. or higher and 800° C. or lower under a non-oxidizing atmosphere. The non-oxidizing atmosphere means an atmosphere in which an oxygen partial pressure is $1.0 \times 10^{-4}$ Pa or less. As a pressurizing condition, it is preferably 0.1 MPa or more.

In order to prevent the metal base or lead-out terminal to be an anode portion from coming into contact with the solid electrolyte layer, it is preferable that a timing of connecting the metal base or lead-out terminal to the porous body is before the solid electrolyte layer is formed. Then, after the metal base or lead-out terminal is connected to the porous body, it is more preferable to perform surface oxidization treatment such as chemical conversion treatment on the porous body and the metal base or lead-out terminal, or to form an insulation portion on portions, of the metal base or lead-out terminal, where the metal base or lead-out terminal may come into contact with the solid electrolyte layer.

Subsequently, the dielectric layer is formed on the surface of the porous body. The dielectric layer can be formed by, for example, anodizing the surface of the porous body in an aqueous solution containing boric acid, phosphoric acid, adipic acid or their sodium salt, ammonium salt, or the like.

By the anodizing, an oxide film of a Ti—Zr—X multicomponent alloy can be formed on the surface of the porous body made from Ti-alloy-containing grains, and the oxide film of the Ti—Zr—X multicomponent alloy becomes a dielectric layer. At this time, in the case where the porous body is joined to the anode portion, an oxide film to be a dielectric layer is also formed on the surface of the anode portion.

The dielectric layer formed by the above-described method can increase the specific surface area of the porous body similarly to the conventional method of forming a dielectric layer by etching and anodizing a porous body of an aluminum foil. Furthermore, since the relative permittivity of the dielectric layer by the Ti-alloy-containing grains is larger than the relative permittivity of the dielectric layer (alumina) by aluminum, it is possible to increase electrostatic capacitance.

Subsequently, the solid electrolyte layer is formed on the dielectric layer. The solid electrolyte layer, for example, can be formed by coating a conductive polymer blending liquid containing a conductive polymer on the dielectric layer and by drying. As the conductive polymer, those described in the solid electrolytic capacitor element of the present invention can be used suitably.

It is preferable that the manufacturing method of the solid electrolytic capacitor element of the present invention further includes a step of forming a conductor layer on the solid electrolyte layer. The conductor layer can be formed by, for example, coating a carbon paste and a silver paste on the surface of the solid electrolyte layer and drying the carbon paste and the silver paste.

The manufacturing method of the solid electrolytic capacitor element of the present invention may further include a step of forming a cathode portion on the conductor layer.

[Manufacturing Method of Solid Electrolytic Capacitor]

A solid electrolytic capacitor, for example, can be manufactured by a step of producing a solid electrolytic capacitor element according to the manufacturing method of the solid electrolytic capacitor element of the present invention, a step of electrically connecting the solid electrolytic capacitor element and a pair of external electrodes, and a step of sealing the solid electrolytic capacitor element with sealing resin.

In the step of electrically connecting the solid electrolytic capacitor element and the pair of external electrodes, the pair of external electrodes are electrically connected to one solid electrolytic capacitor element or a plurality of laminated solid electrolytic capacitor elements.

The method of electrically connecting the pair of external electrodes to one solid electrolytic capacitor element or the plurality of solid electrolytic capacitor elements is not particularly limited. In the case where a plurality of solid electrolytic capacitor elements are used, for example, the following method is cited. First, the anode portions of the solid electrolytic capacitor elements are laminated so as to face each other. At this time, the anode portions are joined to each other, and in addition, an anode terminal as an anode electrode is joined to the anode portions. Examples of the joining method include welding and pressure joining. Moreover, portions corresponding to the conductor layers are laminated so as to come into contact with each other, and a cathode terminal as a cathode electrode is joined to the conductor layers. At this time, in the case where the cathode portion is formed on the outside of the conductor layers, the solid electrolytic capacitor elements may be laminated such that the cathode portions come into contact with each other.

Alternatively, the solid electrolytic capacitor elements may be laminated such that the conductor layer of one solid electrolytic capacitor element and the cathode portion of the other solid electrolytic capacitor element come into contact with each other. Accordingly, the conductor layer and the cathode portion will be electrically connected to each other. In the case where the metal base or the lead-out terminal is connected to the porous body constituting the solid electrolytic capacitor element, the metal base or the lead-out terminal may be used as an anode terminal, or an anode terminal as an external electrode may be connected to the metal base or the lead-out terminal.

In the case where a plurality of solid electrolytic capacitor elements are laminated, the number of the solid electrolytic capacitor elements to be laminated is not particularly limited. However, it is preferably two or more and eight or less in accordance with the required ESR.

After the pair of external electrodes are electrically connected to one solid electrolytic capacitor element or a plurality of solid electrolytic capacitor elements, the sealing is performed with a sealing resin. At this time, the sealing is performed so as to cover the whole solid electrolytic capacitor element and a part of the pair of external electrodes with the sealing resin. Examples of the method of sealing with a sealing resin include a method of sealing with transfer mold by using an epoxy resin.

Note that the form of the external electrode is not limited to the lead-out terminal, and an external electrode of an arbitrary form may be adopted.

EXAMPLE

Examples in which solid electrolytic capacitor elements of the present invention have been disclosed more specifically are shown below. Note that the present invention is not limited only to these examples.

Example A1

[Production of Ti-Alloy-Containing Grain]

First, Ti-alloy-containing grains were manufactured in the following procedure. For 100 g of Si containing metal powder (base grain) with an average grain diameter of 200 nm, film formation processing was performed by sputtering for 60 minutes, whereby covered grains were obtained by forming a coat layer made from a Ti—Zr—X multicomponent alloy (X was Si) with a thickness of 50 nm on their surfaces. The covered grains were dissolved in an acidic aqueous solution, and the obtained acidic aqueous solution was analyzed by the ICP light emission spectrometry. As a result, the composition of the Ti—Zr—X multicomponent alloy was Ti: 80 atm %, Zr: 14 atm %, and X(Si): 6 atm %.

[Production of Porous Body]

The covered grains were mixed with a high viscosity solvent so as to form a paste, and the paste was coated on one surface of an aluminum foil having a thickness of 50 μm such that the thickness of the coated paste became 100 μm, and was fired at 600° C. in vacuum, whereby a porous body made from a sintered body of the Ti-alloy-containing grains was formed on the aluminum foil.

[Formation of Dielectric Layer]

The porous body formed on the aluminum foil was subjected to anodizing treatment for 60 minutes by applying a voltage of 5V in a 0.1 wt % phosphoric acid aqueous solution at a liquid temperature of 65° C., whereby a dielectric layer made from an oxide of a Ti—Zr—Si alloy was formed on the surface of the porous body.

[Formation of Solid Electrolyte Layer]

Onto the surface of the porous body subjected to the anodizing treatment, a conductive polymer blending liquid was coated, and then dried, whereby a solid electrolyte layer was formed on the surface of the dielectric layer. As the conductive polymer blending liquid, a dispersion liquid of PEDOT:PSS (dispersion liquid in which poly (3,4-ethylenedioxy thiophene) and polystyrene sulfonate were mixed) was used.

[Formation of Conductor Layer]

Onto the surface of the solid electrolyte layer (regions exposed from the surface of the porous body), a carbon paste was coated, and then dried, to form a carbon layer. Subsequently, onto the surface of the carbon layer, a silver paste was coated, and then dried, to form a silver layer.

Examples A2 to A27 and Comparative Examples A1 to A3

Solid electrolytic capacitor elements according to Examples A2 to A27 and Comparative Examples A1 to A3 were manufactured in the similar procedure to that in Example A1 except that the composition of the Ti—Zr—X multicomponent alloy was changed to the composition shown in Table 1. In Comparative Example A1, the coat layer was formed by pure Ti, not by the Ti—Zr—X multicomponent alloy, and in Comparative Example A2, the coat layer was formed by Ti—Zr alloy grains. In Comparative Example A3, the Ti-alloy-containing grains were not used, the anodizing treatment was performed for the surface of an aluminum foil with a thickness of 150 μm, and thereafter, the solid electrolyte layer was formed.

Example B1

Solid electrolytic capacitor elements according to Example B1 were produced in the similar procedure to that in Example A1 except that, alloy grains made from a Ti—Zr—X multicomponent alloy (Ti: 80 atm %, Zr: 14 atm %, and X(Si): 6 atm %) were used instead of the covered grains in Example A1.

Examples B2 to B27 and Comparative Examples B1 to B2

Solid electrolytic capacitor elements according to Examples B2 to B27 and Comparative Examples B1 to B2 were manufactured in the similar procedure to that in Example B1 except that the composition of the alloy grains made from the Ti—Zr—X multicomponent alloy was changed to the composition shown in Table 1.

Here, in the Ti—Zr—Al alloy, state diagram calculation (simulation) by the thermodynamics data base of Gibbs energy was performed, and composition ratio was determined in consideration of the solid solubility limit of Al. The actual manufacturing method of a Ti—Zr—Al alloy includes two broadly-separated methods such as a melting method and a sintering method. In the melting method, it is necessary to consider precipitation of excess components during cooling due to deviation from eutectic composition or a difference in a solid solution state by the melting methods (arc melting method, vacuum melting method, atmospheric melting method, and the like). Moreover, in the sintering method, it is necessary to consider a difference in a sintering state due to grain sizes of simple substance powder, grain size distributions, and sintering methods (hot press firing method, vacuum firing method, etc.). Therefore, since a weighed composition from a starting material does not necessarily become the composition of alloy grains, it is preferable to obtain desired electric characteristics by adding Al in excess of a desired composition ratio (for example, 10 atm % to 20 atm % that is more than the solid solution limit) or by adding less Al than the desired composition ratio (for example, 1 atm % to 7 atm % that is less than the solid solution limit).

[Measurement of Leakage Current]

The solid electrolytic capacitor elements according to Examples A1 to A27, Comparative Examples A1 to A3, Examples B1 to B27, and Comparative Example B1 to B2 were connected to a digital multimeter (34410A manufactured by Agilent) and an electric current of the rated 2V was applied, and the value of a leakage current was measured. The value of the leakage current was compared with the product (CV) of electrostatic capacitance and rated voltage and was evaluated according to the following criteria. The results are shown in Table 1 and Table 2.

⊙: Being 1.3 CV or less, and a leakage current is sufficiently small.

○: Although exceeding 1.3 CV, being 45 CV or less, and a leakage current is small.

Δ: Although exceeding 45 CV, being 70 CV or less, and a leakage current is within a usable range.

x: exceeding 70 CV, and a leakage current is large to an extent unable to be used as a cathode, which leads to that there is a problem.

[Measurement of Relative Permittivity]

Foil-shaped products with a thickness of 50 μm obtained by processing the respective Ti—Zr—X multicomponent alloys constituting the solid electrolytic capacitor elements according to Examples A1 to A27, Comparative Examples A1 to A2, Examples B1 to B27, and Comparative Example B1 to B2 and an aluminum foil used in Comparative Examples A3 were prepared, and the prepared products were subjected to anodizing treatment by applying a voltage of 5V in a 0.1 wt % phosphoric acid aqueous solution with a liquid temperature of 65° C., whereby films were produced. The relative permittivity of each of these films was measured and was evaluated according to the following criteria. The results are shown in Table 1 and Table 2.

⊙: Being 55 or more, and the relative permittivity is sufficiently large.

○: Being 32 or more and less than 55, and the relative permittivity is large.

Δ: Being 10 or more and less than 32, and the relative permittivity has no problem.

x: Being less than 10, and the relative permittivity is insufficient.

[Comprehensive Evaluation]

From the leakage current and the relative permittivity each evaluated based on the above-described respective criteria, the comprehensive evaluation as a solid electrolytic capacitor element was determined. For those in which the evaluation of either the leakage current or the relative permittivity was "x", the comprehensive evaluation was determined as "x" regardless of the evaluation of the others. For those in which the evaluations of both the leakage current and the relative permittivity were "Δ", the comprehensive evaluation was determined as "x". For those in which the evaluations of the leakage current and the relative permittivity were "Δ" and "○", the comprehensive evaluation was determined as "Δ". For those in which the evaluations of the leakage current and the relative permittivity were "Δ" and "⊙" or both of them were "○", the comprehensive evaluation was determined as "○". For those in which the evaluations of the leakage current and the relative permittivity were "○" and "⊙" or both of them were "⊙", the comprehensive evaluation was determined as "⊙". The results are shown in Table 1 and Table 2.

TABLE 1

| | Composition of Ti—Zr—X multicomponent alloy | | | | | | | Leakage current | | Relative permittivity | | |
|---|---|---|---|---|---|---|---|---|---|---|---|---|
| | | | Atomic ratio [%] | | | | | Measured | | | | |
| | Ti [atm %] | Zr [atm %] | Ti | Zr | Si | W | Al | value [CV] | Evaluation | Measured value | Evaluation | Comprehensive evaluation |
| Example A1 | 80 | 14 | 85 | 15 | 6 | — | — | 53 | Δ | 40 | ○ | Δ |
| Example A2 | 80 | 14 | 85 | 15 | — | 6 | — | 61 | Δ | 46 | ○ | Δ |
| Example A3 | 80 | 14 | 85 | 15 | — | — | 6 | 50 | Δ | 60 | ⊙ | ○ |
| Example A4 | 70 | 20 | 78 | 22 | 10 | — | — | 43 | ○ | 27 | Δ | Δ |
| Example A5 | 60 | 28 | 68 | 32 | 12 | — | — | 15 | ○ | 24 | Δ | Δ |
| Example A6 | 70 | 20 | 78 | 22 | — | 10 | — | 20 | ○ | 63 | ⊙ | ⊙ |
| Example A7 | 60 | 28 | 68 | 32 | — | 12 | — | 0.5 | ⊙ | 35 | ○ | ⊙ |
| Example A8 | 70 | 20 | 78 | 22 | — | — | 10 | 0.5 | ⊙ | 55 | ⊙ | ⊙ |
| Example A9 | 70 | 27 | 72 | 28 | — | — | 3 | 2.5 | ○ | 64 | ⊙ | ⊙ |
| Example A10 | 70 | 25 | 74 | 26 | 5 | — | — | 23 | ○ | 32 | ○ | ○ |
| Example A11 | 70 | 25 | 74 | 26 | — | 5 | — | 15 | ○ | 70 | ⊙ | ⊙ |
| Example A12 | 70 | 29 | 71 | 29 | — | — | 1 | 12.5 | ○ | 68 | ⊙ | ⊙ |
| Example A13 | 50 | 30 | 63 | 38 | 20 | — | — | 5.3 | ○ | 14 | Δ | Δ |
| Example A14 | 50 | 30 | 63 | 38 | — | 20 | — | 20 | ○ | 19 | Δ | Δ |
| Example A15 | 50 | 30 | 63 | 38 | — | — | 20 | 0.05 | ⊙ | 14 | Δ | ○ |
| Example A16 | 75 | 23 | 77 | 23 | — | — | 2 | 25 | ○ | 60 | ⊙ | ⊙ |
| Example A17 | 75 | 22 | 77 | 23 | — | — | 3 | 1.7 | ○ | 59 | ⊙ | ⊙ |
| Example A18 | 75 | 21 | 78 | 22 | — | — | 4 | 1.3 | ⊙ | 58 | ⊙ | ⊙ |
| Example A19 | 75 | 20 | 79 | 21 | — | — | 5 | 1.2 | ⊙ | 56 | ⊙ | ⊙ |
| Example A20 | 70 | 24 | 74 | 26 | — | — | 6 | 0.6 | ⊙ | 55 | ⊙ | ⊙ |
| Example A21 | 65 | 28 | 70 | 30 | — | — | 7 | 0.7 | ⊙ | 51 | ○ | ⊙ |
| Example A22 | 60 | 32 | 65 | 35 | — | — | 8 | 0.9 | ⊙ | 47 | ○ | ⊙ |
| Example A23 | 60 | 31 | 66 | 34 | — | — | 9 | 0.9 | ⊙ | 45 | ○ | ⊙ |
| Example A24 | 75 | 15 | 83 | 17 | — | — | 10 | 0.5 | ⊙ | 59 | ⊙ | ⊙ |
| Example A25 | 73 | 15 | 83 | 17 | — | — | 12 | 0.7 | ⊙ | 57 | ⊙ | ⊙ |
| Example A26 | 80 | 8 | 91 | 9 | — | — | 12 | 0.16 | ⊙ | 51 | ○ | ⊙ |
| Example A27 | 77 | 8 | 91 | 9 | — | — | 15 | 0.16 | ⊙ | 49 | ○ | ⊙ |

TABLE 1-continued

| | Composition of Ti—Zr—X multicomponent alloy | | | | | | | Leakage current | | Relative permittivity | | |
|---|---|---|---|---|---|---|---|---|---|---|---|---|
| | Ti [atm %] | Zr [atm %] | Atomic ratio [%] | | X [atm %] | | | Measured value [CV] | Evaluation | Measured value | Evaluation | Comprehensive evaluation |
| | | | Ti | Zr | Si | W | Al | | | | | |
| Comparative Example A1 | 100 | — | — | — | — | — | — | 291 | X | 100 | ⊚ | X |
| Comparative Example A2 | 77 | 23 | 77 | 23 | — | — | — | 50 | Δ | 24 | Δ | X |
| Comparative Example A3 | — | — | — | — | — | — | 100 | 0.01 | ⊚ | 8 | X | X |

TABLE 2

| | Composition of Ti—Zr—X multicomponent alloy | | | | | | | Leakage current | | Relative permittivity | | |
|---|---|---|---|---|---|---|---|---|---|---|---|---|
| | Ti [atm %] | Zr [atm %] | Atomic ratio [%] | | X [atm %] | | | Measured value [CV] | Evaluation | Measured value | Evaluation | Comprehensive evaluation |
| | | | Ti | Zr | Si | W | Al | | | | | |
| Example B1 | 80 | 14 | 85 | 15 | 6 | — | — | 53 | Δ | 40 | ○ | Δ |
| Example B2 | 80 | 14 | 55 | 15 | — | 6 | — | 61 | Δ | 46 | ○ | Δ |
| Example B3 | 80 | 14 | 85 | 15 | — | — | 6 | 50 | Δ | 60 | ⊚ | ○ |
| Example B4 | 70 | 20 | 78 | 22 | 10 | — | — | 43 | ○ | 27 | Δ | Δ |
| Example B5 | 60 | 28 | 68 | 32 | 12 | — | — | 15 | ○ | 24 | Δ | Δ |
| Example B6 | 70 | 20 | 78 | 22 | — | 10 | — | 20 | ○ | 63 | ⊚ | ⊚ |
| Example B7 | 60 | 28 | 68 | 32 | — | 12 | — | 0.5 | ⊚ | 35 | ○ | ⊚ |
| Example B8 | 70 | 20 | 78 | 22 | — | — | 10 | 0.5 | ⊚ | 56 | ⊚ | ⊚ |
| Example B9 | 70 | 27 | 72 | 28 | — | — | 3 | 2.5 | ○ | 64 | ⊚ | ⊚ |
| Example B10 | 70 | 25 | 74 | 26 | 5 | — | — | 23 | ○ | 32 | ○ | ○ |
| Example B11 | 70 | 25 | 74 | 26 | — | 5 | — | 15 | ○ | 70 | ⊚ | ⊚ |
| Example B12 | 70 | 29 | 71 | 29 | — | — | 1 | 12.5 | ○ | 68 | ⊚ | ⊚ |
| Example B13 | 50 | 30 | 63 | 38 | 20 | — | — | 5.3 | ○ | 14 | Δ | Δ |
| Example B14 | 50 | 30 | 63 | 38 | — | 20 | — | 20 | ○ | 19 | Δ | Δ |
| Example B15 | 50 | 30 | 63 | 38 | — | — | 20 | 0.05 | ⊚ | 14 | Δ | ○ |
| Example B16 | 75 | 23 | 77 | 23 | — | — | 2 | 2.5 | ○ | 60 | ⊚ | ⊚ |
| Example B17 | 75 | 22 | 77 | 23 | — | — | 3 | 1.7 | ○ | 59 | ⊚ | ⊚ |
| Example B18 | 75 | 21 | 78 | 22 | — | — | 4 | 1.3 | ⊚ | 58 | ⊚ | ⊚ |
| Example B19 | 75 | 20 | 79 | 21 | — | — | 5 | 1.2 | ⊚ | 56 | ⊚ | ⊚ |
| Example B20 | 70 | 24 | 74 | 26 | — | — | 6 | 0.6 | ⊚ | 55 | ⊚ | ⊚ |
| Example B21 | 65 | 28 | 70 | 30 | — | — | 7 | 0.7 | ⊚ | 51 | ○ | ⊚ |
| Example B22 | 60 | 32 | 65 | 35 | — | — | 8 | 0.9 | ⊚ | 47 | ○ | ⊚ |
| Example B23 | 60 | 31 | 66 | 34 | — | — | 9 | 0.9 | ⊚ | 45 | ○ | ⊚ |
| Example B24 | 75 | 15 | 83 | 17 | — | — | 10 | 0.5 | ⊚ | 59 | ⊚ | ⊚ |
| Example B25 | 73 | 15 | 83 | 17 | — | — | 12 | 0.7 | ⊚ | 57 | ⊚ | ⊚ |
| Example B26 | 80 | 8 | 91 | 9 | — | — | 12 | 0.16 | ⊚ | 51 | ○ | ⊚ |
| Example B27 | 77 | 8 | 91 | 9 | — | — | 15 | 0.16 | ⊚ | 49 | ○ | ⊚ |
| Comparative Example B1 | 100 | — | — | — | — | — | — | 291 | X | 100 | ⊚ | X |
| Comparative Example B2 | 77 | 23 | 77 | 23 | — | — | — | 50 | Δ | 24 | Δ | X |

From the results in Tables 1 and 2, it is found that a leakage current is small and a relative permittivity is large in the solid electrolytic capacitor elements of the present invention. Therefore, in the solid electrolytic capacitor element of the present invention, it is possible to obtain large electrostatic capacitance while suppressing a leakage current.

[Measurement of Relationship Between Average Grain Diameter of Ti-Alloy-Containing Grains and Electrode Characteristic]

Furthermore, investigation was made on the average grain diameter of Ti-alloy-containing grains constituting a porous body and the electrode characteristic of the obtained porous body. The average grain diameter of Ti-alloy-containing grains is an average grain diameter (D50) obtained by measuring the Ti-alloy-containing grains with SAXS (X-ray small angle scattering method).

Examples C1 to C2

Solid electrolytic capacitor elements according to Examples C1 to C2 were produced in the similar procedure to that in Example B1 except that the average grain diameter of the Ti-alloy-containing grains was changed to 8 nm and 1.2 μm, respectively. In Example C1, as a representative of those having an average grain diameter of 10 nm or less, Ti-alloy-containing grains having an average grain diameter of 8 nm were adopted. In Example C2, as a representative of those having an average grain diameter of exceeding 1 μm, Ti-alloy-containing grains having an average grain diameter of 1.2 μm (1200 nm) were adopted. Note that Example B1 (an average grain diameter of 200 nm) was adopted as a representative of Ti-alloy-containing grains having an average grain diameter of 10 nm to 1000 nm. An anodic oxide film (hereinafter, also referred to as a chemical conversion film) formed by chemical conversion treatment in each example was evaluated according to the following criteria. The results are shown in Table 3.

[Chemical Conversion Property]

⊙: An extremely dense chemical conversion film having a sufficient thickness is formed and voltage resistance is excellent.

○: A dense chemical conversion film having a sufficient thickness is formed and withstand voltage property is sufficient.

Furthermore, the ESR characteristic and electrode capacitance of the solid electrolytic capacitor elements according to Examples B1 and C1 to C2 were measured by using an LCR meter (E4980A made by KEYSIGHT TECHNOLOGIES) and were evaluated according to the following criteria. The results are shown in Table 3.

[ESR Characteristic]

⊙: Excellent particularly in the value of ESR.

○: Excellent in the value of ESR.

[Electrode Capacitance]

⊙: Electrode capacitance is remarkably large.

○: Electrode capacitance is large.

TABLE 3

|  |  | Example C1 | Example B1 | Example C2 |
|---|---|---|---|---|
|  | Average grain diameter [nm] | 8 | 200 | 1200 |
| Electrode characteristic evaluation | Chemical conversion property | ○ | ⊙ | ⊙ |
|  | ESR characteristic | ○ | ⊙ | ⊙ |
|  | Electrode capacitance | ○ | ⊙ | ○ |

From the results in Table 3, the solid electrolytic capacitor element including a porous body of Ti-alloy-containing grains having an average grain diameter of 10 nm to 1000 nm is excellent in chemical conversion property, ESR characteristic, and electrode capacitance, and the solid electrolytic capacitor element including a porous body of Ti-alloy-containing grains having an average grain diameter exceeding 1000 nm is excellent in chemical conversion property and ESR characteristic.

DESCRIPTION OF REFERENCE SYMBOLS 1, 1A: solid electrolytic capacitor element
2: solid electrolytic capacitor
10: anode portion
17: insulating mask portion
20: capacitance layer
21: porous body
22: Ti-alloy-containing grain
23, 24: dielectric layer
25: solid electrolyte layer
30: conductor layer
40: cathode portion
41a: first solid electrolytic capacitor element laminate
41b: second solid electrolytic capacitor element laminate
42: anode electrode
43: cathode electrode
44: sealing resin

The invention claimed is:

1. A solid electrolytic capacitor element, comprising:
   a porous body;
   a dielectric layer on a surface of the porous body; and
   a solid electrolyte layer on a surface of the dielectric layer, wherein the porous body is made from a sintered body of a Ti-alloy-containing grain having a Ti—Zr—X multicomponent alloy on a surface thereof,
   the X is at least one valve metal element selected from Si, Hf, Y, Al, Mo, W, Ta, Nb, and V, and
   a composition of the Ti—Zr—X multicomponent alloy is
   Ti: 50 atm % to 80 atm %,
   Zr: 8 atm % to 32 atm %, and
   X: 1 atm % to 20 atm %.

2. The solid electrolytic capacitor element according to claim 1, wherein the X is Al.

3. The solid electrolytic capacitor element according to claim 1, wherein the X is Al, and a content of the X in the Ti—Zr—X multicomponent alloy is 1 atm % to 15 atm %.

4. The solid electrolytic capacitor element according to claim 1, wherein the X is Al, and a content of the X in the Ti—Zr—X multicomponent alloy is 4 atm % to 12 atm %.

5. The solid electrolytic capacitor element according to claim 1, wherein the X is Al, and a content of the X in the Ti—Zr—X multicomponent alloy is 10 atm % to 15 atm %.

6. The solid electrolytic capacitor element according to claim 1, wherein the X is Al, and a content of the X in the Ti—Zr—X multicomponent alloy is 10 atm % to 12 atm %.

7. The solid electrolytic capacitor element according to claim 1, wherein a content of the Zr [Zr/(Ti+Zr)] occupying in a sum total of the Ti and the Zr is 9 atm % to 38 atm %.

8. The solid electrolytic capacitor element according to claim 1, wherein a content of the Zr [Zr/(Ti+Zr)] occupying in a sum total of the Ti and the Zr is 9 atm % to 35 atm %.

9. The solid electrolytic capacitor element according to claim 1, wherein a content of the Zr [Zr/(Ti+Zr)] occupying in a sum total of the Ti and the Zr is 17 atm % to 26 atm %.

10. The solid electrolytic capacitor element according to claim 1, wherein the X is Si, and a content of the X in the Ti—Zr—X multicomponent alloy is 5 atm % to 20 atm %.

11. The solid electrolytic capacitor element according to claim 1, wherein the X is W, and a content of the X in the Ti—Zr—X multicomponent alloy is 5 atm % to 20 atm %.

12. The solid electrolytic capacitor element according to claim 1, wherein an average grain diameter of the Ti-alloy-containing grain is 10 nm to 1 μm.

13. The solid electrolytic capacitor element according to claim 1, wherein the Ti-alloy-containing grain is a covered grain in which a surface of a base grain is covered with a coat layer made from the Ti—Zr—X multicomponent alloy.

14. The solid electrolytic capacitor element according to claim 13, wherein the base grain is made from at least one valve metal element selected from Zr, Ti, Si, Hf, Y, Al, Mo, W, Ta, Nb, and V.

15. The solid electrolytic capacitor element according to claim 1, wherein the Ti-alloy-containing grain is a Ti—Zr—X multicomponent alloy grain.

16. The solid electrolytic capacitor element according to claim 1, further comprising a metal base containing Al, Ti, Ta, or a Ti—Zr—X multicomponent alloy, and wherein the porous body is on the metal base.

17. The solid electrolytic capacitor element according to claim 1, wherein the dielectric layer is an oxide of the Ti—Zr—X multicomponent alloy.

18. A solid electrolytic capacitor comprising:
    the solid electrolytic capacitor element according to claim 1;
    a sealing resin that seals the solid electrolytic capacitor element; and
    a pair of external electrodes that are electrically connected to the solid electrolytic capacitor element.

19. A manufacturing method of a solid electrolytic capacitor element, the method comprising:

sintering a Ti-alloy-containing grain having a Ti—Zr—X multicomponent alloy on a surface thereof to obtain a porous body made from the Ti-alloy-containing grain, where X is at least one valve metal element selected from Si, Hf, Y, Al, Mo, W, Ta, Nb, and V, and a composition of the Ti—Zr—X multicomponent alloy is Ti: 50 atm % to 80 atm %, Zr: 8 atm % to 32 atm %, and X: 1 atm % to 20 atm %;

forming a dielectric layer on a surface of the porous body; and forming a solid electrolyte layer on the dielectric layer.

20. The manufacturing method of a solid electrolytic capacitor element according to claim 19, wherein the sintering is performed after the Ti-alloy-containing grain is compressed or while the Ti-alloy-containing grain is being compressed.

21. The manufacturing method of a solid electrolytic capacitor element according to claim 19, wherein a covered grain is used as the Ti-alloy-containing grain, the covered grain having a coat layer made from a Ti—Zr—X multicomponent alloy formed on a surface of a base grain by any of sputtering, vapor deposition, and electroless plating.

22. The manufacturing method of a solid electrolytic capacitor element according to claim 19, wherein an alloy grain obtained by pulverizing a Ti—Zr—X multicomponent alloy is used as the Ti-alloy-containing grain.

* * * * *